Dec. 11, 1962     J. H. HARTMAN     3,067,630
VALVE SHANK PROTECTOR
Filed June 1, 1961
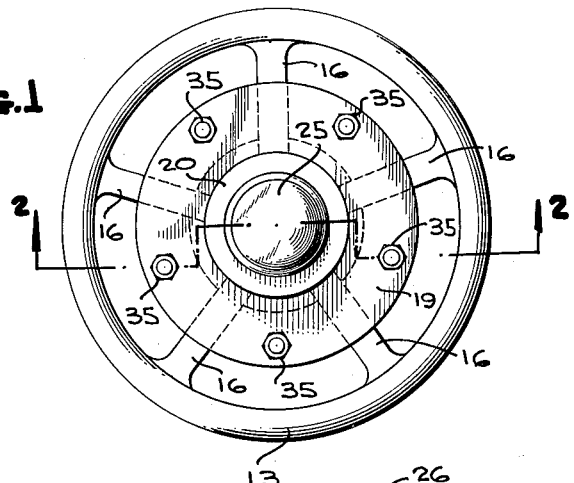
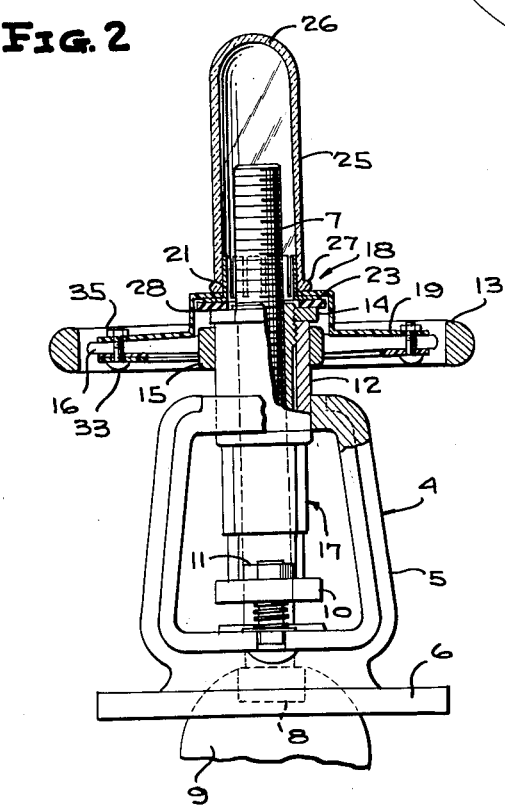
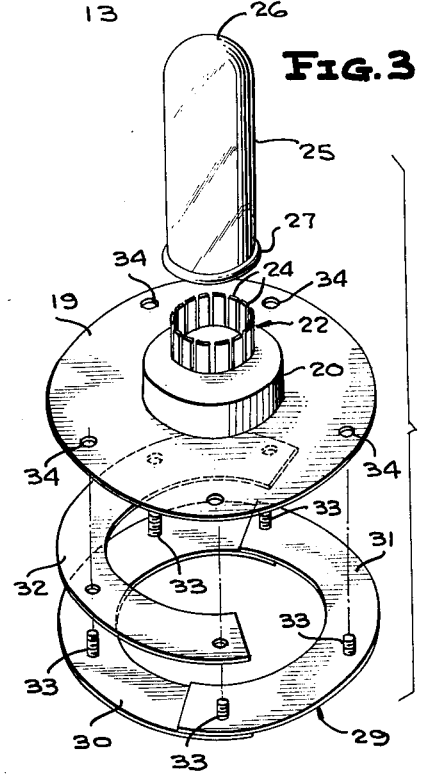
INVENTOR
JOSEPH H. HARTMAN
BY *Lowry & Rinehart*
ATTORNEYS

United States Patent Office 3,067,630
Patented Dec. 11, 1962

3,067,630
VALVE SHANK PROTECTOR
Joseph H. Hartman, 215 Hartranft Ave., Norristown, Pa.
Filed June 1, 1961, Ser. No. 114,102
3 Claims. (Cl. 74—608)

This invention relates in general to new and useful improvements in attachments for valves, and more particularly to a novel valve shank protector particularly adapted to protect the normally exposed end of a valve shank which extends beyond the hand wheel of a valve operating mechanism.

In the customary large valve construction, the operating mechanism includes a hand wheel which is carried by a nut member mounted for rotation only and in which is threaded a valve shank. This valve shank is moved longitudinally of its axis as the hand wheel is rotated and at all times, there is a portion of the valve shank projecting beyond the hand wheel. This exposed portion of the valve shank is subject to excess wear due to the accumulation of grime and dirt thereon, or, when the valve controls the flow of chemicals, the valve shank is subject to attack by the chemicals.

It is therefore the primary object of this invention to provide a novel valve shank protector which may be mounted on the hand wheel of a valve operating mechanism and which will completely encase the normally exposed portion of the valve shank to protect the same from all types of foreign matter, including dirt and grime or chemicals.

In my prior Patent No. 2,578,630, granted December 11, 1951, there is disclosed a valve shank protector of the general type to which the present invention relates. However, this valve shank protector has several deficiencies. In the first place, in order to install the valve shank protector, it is necessary to remove the usual locknut for the hand wheel in order to install an internally threaded cup-like member. A sleeve is then threaded into the cup-like member. As a result, the cup-like member, which is formed of metal, is subject to attack by chemicals. In addition to the two foregoing deficiencies, the cup-like member fails to provide adequate coverage both for the central nut member through which the valve shank passes and for other mechanisms of the valve operating mechanism underlying the hand wheel.

It is therefore another object of this invention to provide a novel valve shank protector which is of a construction whereby it may be readily attached to an existing valve structure without removing any element whatsoever thereof, the valve shank protector being securable directly to the hand wheel of the valve operating mechanism.

Another object of this invention is to provide a novel valve shank protector which will completely encase all of the mechanism exposed above the hand wheel, the valve shank protector including a large diameter mounting flange which overlies major portions of the spokes of the hand wheel and thus prevents the direct dropping of foreign matter through the hand wheel onto the remainder of the valve operating mechanism.

With the above and other objects in view that will hereinafter appear, the nature of the invention will be more clearly understood by reference to the following detailed description, the appended claims and the several views illustrated in the accompanying drawing.

In the drawing:

FIGURE 1 is a plan view of a valve operating mechanism provided with a valve shank protector in accordance with the invention.

FIGURE 2 is an elevational view of the valve operating mechanism only, with the upper portion thereof broken away and shown in section, and shows the specific details of the valve shank protector.

FIGURE 3 is an exploded perspective view showing the specific details of the components of the valve shank protector.

Referring now to the drawing in detail, it will be seen that there is illustrated a conventional type of valve operating mechanism which is generally referred to by the numeral 4. The valve operating mechanism includes a yoke member 5 having formed integral with the lower end thereof an attaching flange 6 which is bolted in a customary manner to the usual valve head (not shown). A valve shank 7 passes through the yoke member 5 and is attached at its lower end, as at 8, to a vertically reciprocable valve member 9. The yoke 5 is provided with a suitable packing gland 10 for sealing the lower portion of the valve shank 7 with respect to the yoke 5. The packing gland 10 is adjustable by means of suitable bolts 11.

The upper portion of the yoke 5 carries a swivelled nut member 12 which is mounted for rotation only within the yoke 5. The nut member 12 is internally threaded in the normal manner and the valve shank 7, which passes therethrough, is threaded therein. A hand wheel 13 is telescoped over the upper part of the nut member 12 and is secured on the nut member 12 by means of a locking nut 14. The hand wheel 13 includes a central hub 15 having a plurality of spokes 16 radiating therefrom.

That portion of the valve shank 7 disposed between the nut member 12 and the packing gland 10 is protected by a telescoping sleeve arrangement, generally referred to by the numeral 17. This telescoping sleeve arrangement is the subject of my Patent No. 2,578,629, granted December 11, 1951, and will not be described in more detail here. However, it will be apparent that the valve shank 7 is protected against foreign matter below the nut member 12.

The nut member 12 being fixed against movement other than rotary movement, it will be seen that as the hand wheel 13 is turned to rotate the nut member 12, the valve shank 7 is advanced longitudinally of its axis through the nut member 12. In the usual construction, even in the fully seated position of a valve member, the valve shank 7 still projects slightly beyond the hand wheel 13. It is the purpose of this invention to protect this exposed portion of the valve shank 7. To this end, there is provided the valve shank protector, which is the subject of this invention, the valve shank protector being generally referred to by the numeral 18.

The valve shank protector 18 includes a large diameter mounting flange 19 which overlies the spokes 16 of the hand wheel 13. The mounting flange 19 is provided with an offset central hub 20 which provides suitable clearance for the exposed portion of the nut member 12 and the locking nut 14. The hub 20 is provided with a central opening 21 through which the valve shank 7 passes.

A spring retainer, generally referred to by the numeral 22, is carried by the hub 20. The spring retainer 22 includes an annular mounting flange 23 which is disposed within the confines of the hub 20, and which has integrally connected thereto a plurality of spring fingers 24 which extend out through the opening 21.

A valve shank protecting sleeve 25 is removably retained in position by the spring fingers 24, the lower end of the sleeve 25 being telescoped over the spring fingers 24 and being held thereon by the tension of the spring fingers 24. The sleeve 25 is provided with a rounded closed upper end 26 to prevent the entrance of foreign matter thereinto. The lower end of the sleeve 25 includes an outwardly directed flange 27. When the sleeve 25 is properly secured in place, the flange 27 is seated on the upper surface of the hub 20 and forms a seal therewith to prevent the entrance of foreign matter between the sleeve 25 and the hub 20, whereby the spring retainer 22 is protected from foreign matter.

A seal is also provided between the hub 20 and the nut member 12. To this end, there is provided a resilient sealing ring 28 which is disposed within the hub 20 and which bears against the underside of the mounting flange 23 of the spring retainer 22. The sealing ring 28, in use, is tightly clamped against the upper end of a locking nut 14 and forms a seal therewith.

One of the primary advantages of the present invention is the fact that it may be attached to the hand wheel 13 without disassembling any part of the valve structure. This is accomplished by means of a clamp ring, generally referred to by the numeral 29. The clamp ring 29 is split and is formed of a lower clamp ring segment 30 which has the ends thereof overlapped by an intermediate clamp ring segment 31. An upper clamp ring segment 32, which is identical with the clamp ring segment 30 and overlies the same, has its ends in overlapping relation to the clamp ring segment 31.

The clamp ring 29 is provided with a plurality of bolts 33 which extend through the clamp ring segments. The bolts are arranged to pass between the spokes 16 of the hand wheel 13 and the clamp ring segments are each of a circumferential extent so that the overlapping ends of the clamp ring segments are held together by certain of the bolts 33.

The mounting flange 19 is provided with a plurality of bolt openings 34 which are aligned with the bolts 33. When it is desired to mount the valve shank protector on the hand wheel 13, it is merely necessary to place the mounting flange 19 into overlying position with respect to the hand wheel 13, as is shown in FIGURE 2. The clamp ring segments of the clamp ring 29 may be partially assembled, if desired, by passing one of the bolts 33 through overlapped ends of the clamp ring segments. The clamp ring 29 is then merely passed around the nut member 12 below the hand wheel 13, after which the opposite ends of the clamp ring segments are brought into the proper overlapped relation and the remaining bolts 33 are passed through the clamp ring 29. The bolts 33 are then passed up through the bolt openings 34 in the mounting flange 19 and nuts 35 are applied to the upper ends of the bolts 33. When the mounting flange 19 is tightly pulled down against the spokes 16, the sealing ring 28 is clamped against the locking nut 14 to provide the necessary seal therewith. The spring retainer 22 is now ready to receive the sleeve 25 to complete the assembling of the valve shank protector in place.

Depending upon the use of the valve operating mechanism 4, the entire structure of the valve shank protector 18 may be formed of a suitable plastic material. However, under normal use conditions, the spring retainer 22 and the bolts 33 and nuts 35 will be formed of metal. This metal, of course, will be a noncorrosive metal, such as stainless steel or the like.

From the foregoing, it will be apparent that there has been devised a simple valve shank protector which may be readily installed on a valve operating mechanism without removing any components thereof, and when installed leaves no part of the valve shank exposed to attack by chemicals or other foreign matter normally harmful to metals. Although a preferred embodiment of the invention has been illustrated, it is not intended to so limit the invention to the specific illustrated structure. Obvious modifications in form and material may be made without departing from the spirit and scope of the invention, as defined in the appended claims.

What is claimed as new is:

1. For use in association with a valve hand wheel of the type mounted for rotation only and held against longitudinal movement, a central nut member carried by the hand wheel, and a threaded valve shank threaded in the central nut member and projecting beyond the hand wheel with the projection of the valve shank varying with respect to the hand wheel; a valve shank protector, said valve shank protector including a mounting flange, means for securing said mounting flange directly to the valve hand wheel, said mounting flange having a central hub with an overhanging flange, sealing means within said hub at the underside of said flange for sealing engagement with the upper surface of the central nut member about the valve shank, said hub having an opening therethrough for the passage of the valve shank, a spring retainer having a ring-like mounting flange confined between the flange of the hub and the central nut member, a circular series of spring fingers rising from the center of the mounting flange and projecting through said valve shank opening, and a closed end sleeve having an open end telescoped over said spring fingers and removably secured to said hub in sealed relation thereto.

2. The valve shank protector of claim 1 wherein said securing means includes a clamp ring underlying said mounting flange and adapted to cooperate with said mounting flange in the clamping of spokes of the hand wheel therebetween, and fasteners connecting said clamp ring to said mounting flange.

3. The valve shank protector of claim 2 wherein said clamp ring is formed in sections whereby said clamp ring may be applied without the removal of the hand wheel.

References Cited in the file of this patent

UNITED STATES PATENTS

| | | |
|---|---|---|
| 1,664,694 | Lovvorn | Apr. 3, 1928 |
| 1,753,631 | Walters | Apr. 8, 1930 |
| 1,777,329 | Schweinert | Oct. 7, 1930 |
| 2,578,630 | Hartman | Dec. 11, 1951 |
| 2,738,684 | Shafer | Mar. 20, 1956 |
| 2,816,566 | Warren | Dec. 17, 1957 |
| 2,861,473 | Allman et al. | Nov. 25, 1958 |